(12) United States Patent
Kushida et al.

(10) Patent No.: US 7,933,690 B2
(45) Date of Patent: Apr. 26, 2011

(54) VEHICLE RECOGNITION ALLOWING DEVICE

(75) Inventors: Kazumitsu Kushida, Wako (JP); Mutsumi Katayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 850 days.

(21) Appl. No.: 11/359,140

(22) Filed: Feb. 22, 2006

(65) Prior Publication Data
US 2006/0192664 A1 Aug. 31, 2006

(30) Foreign Application Priority Data

Feb. 23, 2005 (JP) ................................ 2005-047013

(51) Int. Cl.
*B60Q 1/26* (2006.01)
(52) U.S. Cl. ............ 701/1; 340/438; 340/441; 340/468; 340/478; 315/77; 701/36; 701/70; 701/301
(58) Field of Classification Search ............... 701/1, 301; 340/463, 468, 475, 478, 479
See application file for complete search history.

(56) References Cited

U.S. PATENT DOCUMENTS

| | | | | |
|---|---|---|---|---|
| 3,706,972 A * | 12/1972 | Okuhara | ....................... | 340/478 |
| 6,049,171 A * | 4/2000 | Stam et al. | ....................... | 315/82 |
| 6,097,023 A * | 8/2000 | Schofield et al. | .......... | 250/208.1 |
| 6,351,211 B1 * | 2/2002 | Bussard | ........................ | 340/468 |
| 6,406,172 B1 * | 6/2002 | Harbers et al. | ................ | 362/544 |
| 6,677,856 B2 * | 1/2004 | Perlman et al. | ............... | 340/468 |
| 6,700,502 B1 * | 3/2004 | Pederson | ................. | 340/815.45 |
| 6,992,572 B1 * | 1/2006 | Lovegrove | .................... | 340/432 |
| 7,119,672 B2 * | 10/2006 | Subbaraman | ................. | 340/465 |
| 7,710,243 B2 * | 5/2010 | Akatsuka et al. | .......... | 340/425.5 |
| 2003/0231109 A1 * | 12/2003 | Kim | ............................... | 340/479 |
| 2004/0143380 A1 * | 7/2004 | Stam et al. | ....................... | 701/36 |
| 2004/0201673 A1 * | 10/2004 | Asai | ............................... | 348/148 |
| 2004/0234268 A1 * | 11/2004 | Olch | ............................... | 398/118 |
| 2005/0062597 A1 * | 3/2005 | Su | ................................. | 340/475 |
| 2005/0195073 A1 * | 9/2005 | Subbaraman | ................. | 340/465 |

FOREIGN PATENT DOCUMENTS

| | | |
|---|---|---|
| DE | 39 02 627 A1 | 8/1990 |
| DE | 44 44 728 A1 | 9/1995 |
| DE | 196 25 960 A1 | 1/1998 |
| DE | 197 22 775 A1 | 12/1998 |
| DE | 100 48 010 A1 | 6/2001 |
| JP | 08-133149 | 5/1996 |
| JP | 10-067276 | 3/1998 |
| JP | 10-115519 | 5/1998 |

OTHER PUBLICATIONS

Office Action Issued May 6, 2009 by the German Patent and Trademark Office in related application No. DE 10 206 008 278.8-31.

* cited by examiner

*Primary Examiner* — Jack Keith
*Assistant Examiner* — Jonathan M Dager
(74) *Attorney, Agent, or Firm* — Hamre, Schumann, Mueller & Larson, P.C.

(57) ABSTRACT

A vehicle recognition allowing device is provided which allows the recognition of a traveling state of a vehicle, including a two-wheeled vehicle to be recognized and does not require a sophisticated image processing function. When a change in the speed, traveling state or both of the vehicle is detected by a traveling state detecting part, flickering frequencies of respective infrared ray markers are increased or decreased to a frequency corresponding to the change in speed, traveling state or both. Alternatively, flickering duty ratios of the respective infrared ray markers can be changed to a duty ratio corresponding to the new speed, traveling state or both.

7 Claims, 5 Drawing Sheets

VEHICLE RECOGNITION ALLOWING DEVICE

FIELD

The present invention relates to a vehicle recognition allowing device which allows an environment to recognize the presence or the non-presence of a car, and more particularly to a vehicle recognition allowing device which is suitable for allowing a succeeding vehicle or an oncoming vehicle to recognize the presence or the non-presence of a motorcycle.

BACKGROUND

There exists a region or an area where it is important for a driver of a succeeding vehicle or an oncoming vehicle to recognize the presence of a motorcycle. Ordinarily, the motorcycle is obliged to turn on a headlight whether day or night. Further, there has been developed a vehicle recognition system which allows other vehicles to recognize the presence of a car and to allow these other vehicles to execute predetermined control processing or, as an opposite case, a vehicle recognition system which allows a car to recognize the presence of other vehicles and to allow that car to execute predetermined control processing. Some of these vehicle recognition systems are now being realized.

In published patent application JP-A-10-115519, a vehicle-use position recognition device is proposed, in which three or more infrared LEDs are arranged on a back surface of a vehicle body of a preceding vehicle, while a camera, mounted on a succeeding vehicle, takes a picture of the rear surface of the vehicle body of the preceding vehicle. A distance between the vehicles or a relative yaw angle is measured based on the infrared image of the preceding vehicle taken by the camera of the succeeding vehicle.

In a recognition/non-recognition system which utilizes infrared rays, it is necessary to recognize accurately in a short time whether the infrared ray source, detected by an image pickup element in the recognition-side vehicle, is a source of normal infrared rays which are emitted from a light emitting element of the recognition-side vehicle or is a mere external light. Further, aspects of a lamp mounted on the vehicle, including mounting position, coloring, brightness and the like are regulated by governmental laws or regulations. Hence, to ensure a high recognition ratio, it is necessary to provide a recognition system for the recognition-side vehicle which possesses a sophisticated image processing function.

Further, in published patent application JP-A-10-115519, it is necessary to arrange the infrared-ray LEDs to be recognized on the preceding vehicle at a plurality of positions. However, a technical drawback occurs when the preceding vehicle or the oncoming vehicle is a motorcycle, in that it is difficult to ensure a mounting space for infrared ray LEDs.

Further, even when the presence of the vehicle to be recognized is recognized, the response of the succeeding vehicle or the oncoming vehicle on the recognition side differs corresponding to a traveling state of the recognized vehicle. Hence, it is desirable to allow the system to recognize not only the presence or the non-presence of the vehicle to be recognized but also the traveling state of the recognized vehicle.

BRIEF SUMMARY

It is an object of this invention to overcome the above-mentioned drawbacks of the related art and to provide a vehicle recognition allowing device which requires no sophisticated image processing function for a recognition-side vehicle, is easily applicable to a case in which a vehicle to be recognized is a motorcycle, and can also recognize a traveling state of the vehicle to be recognized.

To achieve the above-mentioned object, the present invention includes, in a vehicle recognition allowing device which operates in an environment to recognize the presence or non-presence of a vehicle, the following contributions.

(1) The vehicle recognition allowing device includes an infrared ray marker which outputs infrared rays, a detecting routine which detects a traveling state of the vehicle, and a drive circuit which allows the infrared ray marker to emit light with a pattern in response to a detection result of the detecting routine.

(2) A flickering cycle of the infrared ray marker is changed in response to a traveling state of the vehicle.

(3) A flickering duty ratio of the infrared ray marker is changed in response to a traveling state of the vehicle.

(4) A flickering phase of each infrared ray marker is changed in response to a traveling state of the vehicle.

(5) The vehicle recognition allowing device includes three infrared ray markers, wherein the respective infrared ray markers are arranged in a distributed manner as viewed from at least one of a plan view, a back view and both side views of a vehicle.

Accordingly, the following advantageous effects can be obtained.

(1) Since the infrared ray marker emits light in the light emitting pattern in response to the traveling state of the vehicle, the succeeding vehicle or the oncoming vehicle which senses the infrared ray marker can recognize not only the presence or non-presence of the vehicle to be recognized but also the traveling state of the vehicle which can include, for example the vehicle speed, the handle steering angle, the acceleration/deceleration, the yaw rate, the bank angle or the like.

(2) Since the flickering cycle of the infrared ray marker is changed in response to the traveling state of the vehicle, the traveling state of the vehicle can be represented by the flickering cycle of the infrared ray marker.

(3) Since the flickering duty ratio of the infrared ray marker is changed in response to the traveling state of the vehicle, the traveling state of the vehicle can be represented by the flickering duty ratio of the infrared ray marker.

(4) Since the flickering phases of the respective infrared ray markers are changed in response to the traveling state of the vehicle, the traveling state of the vehicle can be represented by the flickering phases of the respective infrared ray markers.

(5) Since three infrared ray markers are arranged in a distributed manner at respective apex positions of an imaginary triangle as viewed in a front view, a back view or a side view of the vehicle, it is possible to easily identify whether an infrared light source which is detected on an infrared ray image obtained by taking a picture of the vehicle is the infrared ray marker or other external light.

DETAILED DESCRIPTION

Figure 1:
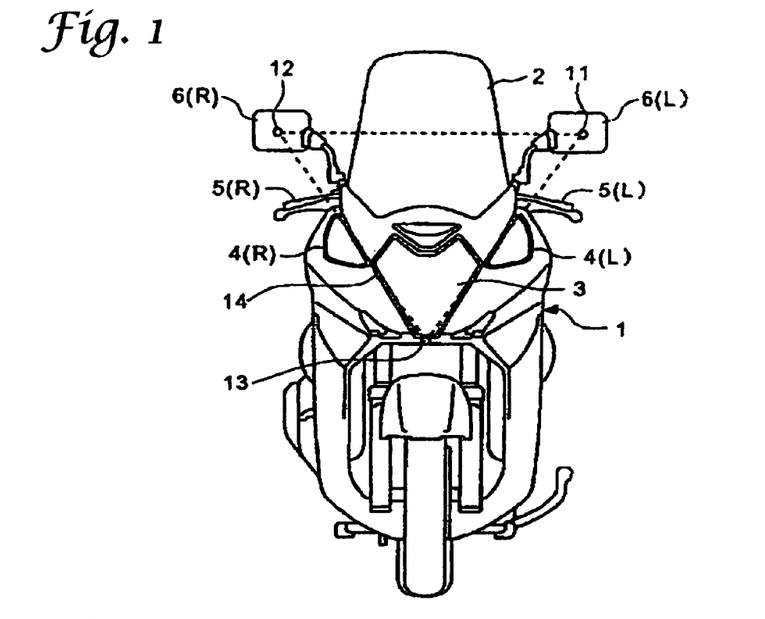
FIG. 1 is a front view of a first embodiment of a motorcycle on which a vehicle recognition allowing device according to the invention is mounted.

Hereinafter, referring to the drawings, preferred embodiments of the invention are explained in detail. FIG. 1 is a front view of a motorcycle on which a vehicle recognition allowing device is mounted according to the invention.

A front cowl 1 is mounted on the front portion of a vehicle body, and a transparent screen 2 is mounted on the V-shaped or U-shaped cut-out portion opened in an upper portion of the front cowl 1. A headlight 3 is mounted on a center distal end portion of the front cowl 1, while a pair of left and right blinker lamps 4 (L, R) are mounted on both end portions of the front cowl 1 in a state that the blinker lamps 4 are on either side of headlight 3. Both the headlight 3 and the blinker lamps 4 are lighting equipment which satisfies safety standards. A pair of left and right side mirrors 6 (L, R) is mounted on proximal portions of handle grips 5 (L, R) respectively.

On back surfaces of the left and right side mirrors 6 (L, R), a first infrared ray marker 11 and a second infrared ray marker 12 are respectively mounted in a state that the infrared ray markers 11, 12 are directed in the frontward direction of the vehicle body. The respective infrared ray markers 11 and 12 are self-luminous markers which use near-infrared LEDs as light sources thereof. The infrared ray markers 11 and 12 may be constituted of a single LED, or may be constituted by integrating or merging a plurality of LEDs.

Further, in this embodiment, at a position below the headlight 3 of the front cowl 1, a third infrared ray marker 13 is arranged in a state that the third infrared ray marker 13 is directed in the frontward direction of the vehicle body. Accordingly, with respect to an infrared image as viewed from a front view of the vehicle, an inverted triangle 14 which arranges the first to third infrared ray markers 11, 12, 13 at respective apexes thereof and arranges the headlight 3 in the inside thereof is recognized.

Figure 2:
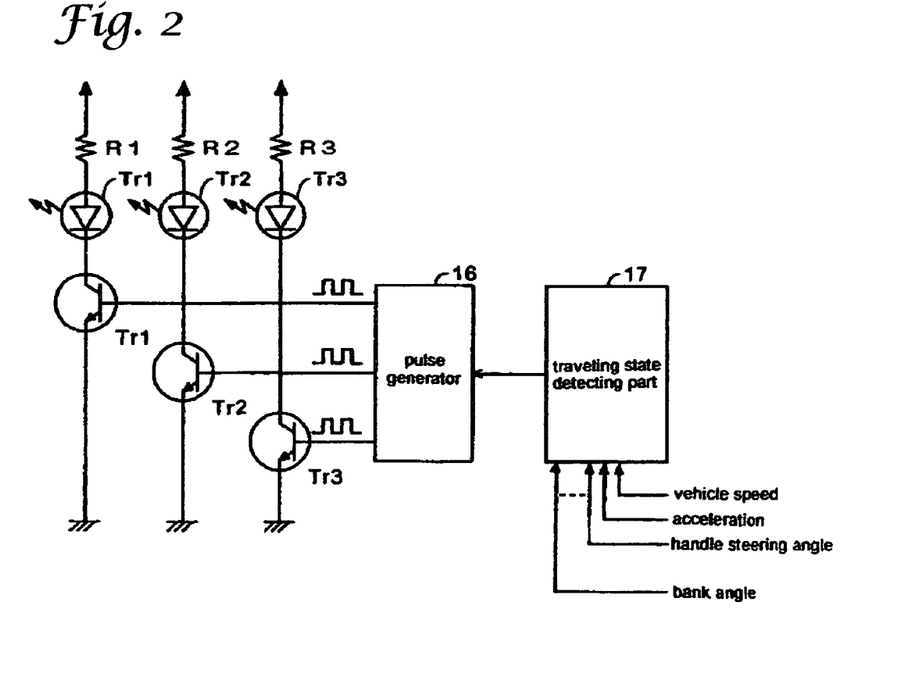
FIG. 2 is a block diagram of a drive circuit which allows infrared ray markers to emit light in a predetermined light-emitting pattern.

FIG. 2 is a block diagram of a drive circuit for performing the current driving of the respective infrared ray markers 11, 12, 13. In the respective infrared ray markers 11, 12, 13, a current-limiting resistor R1, R2, R3 and a switching transistor Tr1, Tr2, Tr3 are connected in series respectively. A traveling state detecting part 17 detects a traveling state such as a vehicle speed, the acceleration, the deceleration, a handle steering angle, a yaw rate, a bank angle or the like of the vehicle and informs a pulse generator 16 of a detection result. The pulse generator 16 independently performs the switching of respective switching transistors Tr1, Tr2, Tr3 with light emitting patterns in response to the traveling state of the vehicle informed from the traveling state detecting part 17, and allows the respective infrared ray markers 11, 12, 13 to emit light with unique patterns in response to the traveling state.

Figure 3:
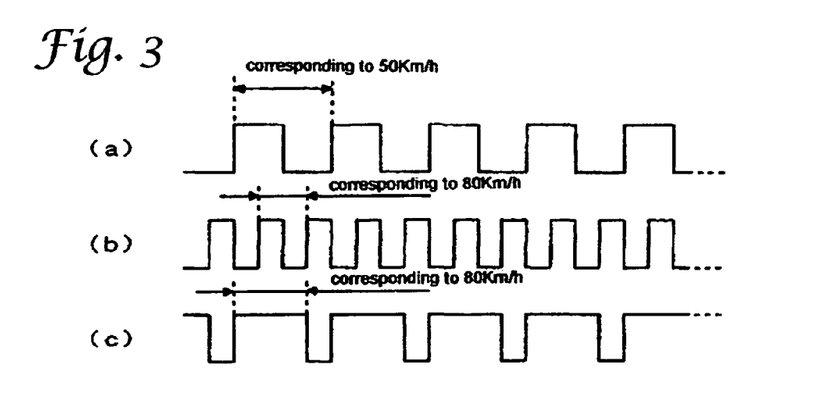
FIG. 3 is a timing chart in the first case, showing the manner in which the light-emitting pattern of the infrared ray markers is changed in response to a traveling state of a vehicle.

FIG. 3 is a timing chart of the first embodiment in which light emitting patterns of respective infrared ray markers 11, 12, 13 are changed in response to the traveling state of the vehicle.

For example, the light emitting pattern while traveling at a speed of 50 km per hour is shown in FIG. 3(a). When the speed is elevated to 80 km per hour and this elevation is detected by a traveling state detecting part 17, the traveling state detecting part 17 instructs the pulse generator 16 to increase flickering frequencies of the respective infrared ray markers to a frequency corresponding to the 80 km per hour speed. As a result, the frequency of a pulse signal outputted from the pulse generator 16 is elevated as shown in FIG. 3(b) and hence, the flickering frequencies of the respective infrared ray markers 11, 12, 13 are increased.

Alternatively, the traveling state detecting part 17 may instruct the pulse generator 16 to elevate flickering duty ratios of the respective infrared ray markers to a duty ratio corresponding to the 80 km per hour speed. As a result, the duty ratio of the pulse signal outputted from the pulse generator 16 is elevated as shown in FIG. 3(c) and hence, the flickering duty ratios of the respective infrared ray markers 11, 12, 13 are also increased.

Here, the above-mentioned embodiment has been made with respect to the case in which the light emitting patterns of all infrared ray markers 11, 12, 13 are controlled in a similar manner. However, the traveling state of the vehicle may be expressed by relatively making the light emitting patterns of the respective infrared ray markers different from each other.

Figure 4:
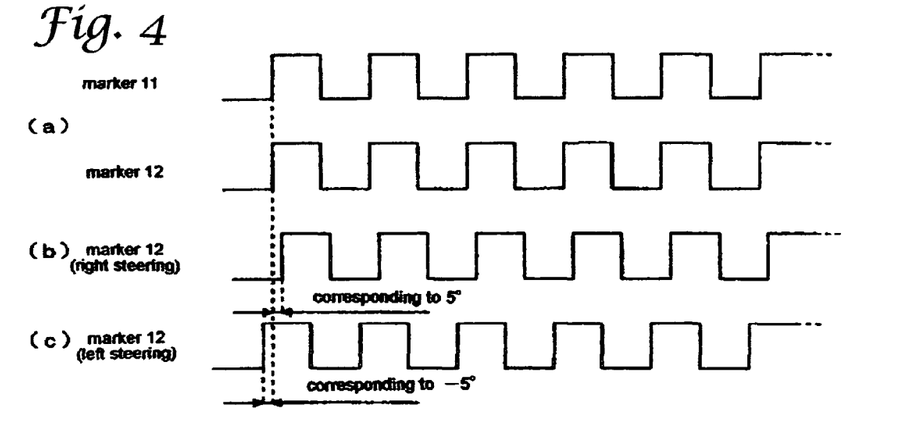
FIG. 4 is a timing chart in the second case, showing the manner in which the light-emitting pattern of the infrared ray markers is changed in response to a traveling state of a vehicle.

FIG. 4 is a timing chart showing another embodiment in which the light emitting patterns of the respective infrared ray markers are changed corresponding to the traveling state of the vehicle. In this embodiment, focus is placed on two infrared ray markers 11, 12.

For example, assume FIG. 4(a) is the light emitting pattern during straight travel, where a handle steering angle is 0°. During right turning, when a handle is steered by the steering angle of 5° in the right direction and such steering is detected by the traveling state detecting part 17, the traveling state detecting part 17 instructs the pulse generator 16 to delay a flickering phase of the infrared ray marker 12 with respect to a flickering phase of the infrared ray marker 11 by an angle corresponding to the steering angle 5°. As a result, as shown in FIG. 4(b), a phase of the pulse signal which is outputted to a switching transistor Tr2 from the pulse generator 16 has an angle thereof delayed with respect to a pulse signal outputted to the switching transistor Tr1 by an angle of 5°.

In the same manner, during left turning when the handle is steered by the steering angle of 5° (−5°) in the left direction and such steering is detected by the traveling state detecting part 17, the traveling state detecting part 17 instructs the pulse generator 16 to advance a flickering phase of the infrared ray marker 12 with respect to a flickering phase of the infrared ray marker 11 by an angle corresponding to the steering angle 5°. As a result, as shown in FIG. 4(c), the phase of the pulse signal which is outputted to the switching transistor Tr2 from the pulse generator 16 has an angle thereof advanced with respect to a pulse signal outputted to the switching transistor Tr1 by an angle of 5°.

Here, such a phase control is not limited to the application of the steering angle. Besides the steering angle, when one of acceleration and deceleration, one of a left bank and a right bank, or one of left turn and right turn is detected, the drive circuit may allow an angle of the flickering phase of one infrared ray marker to advance or delay with respect to the angle of a flickering phase of another infrared ray marker, while when another of the acceleration and the deceleration, another of the left bank and the right bank, or another of the left turn or the right turn is detected, the drive circuit may allow the angle of the flickering phase of the another one infrared ray marker to advance with respect to the angle of the flickering phase of the one infrared ray marker.

Further, to express the above-mentioned traveling state of the vehicle with the relative ratio of the flickering duty ratio, when the traveling state of the vehicle is one of the left steering and the right steering, one of acceleration and deceleration, one of a left bank and a right bank, or one of left turn and right turn, the drive circuit may set a flickering duty ratio of one infrared ray marker larger than a flickering duty ratio of another one infrared ray marker, while when the traveling state of the vehicle is another of the left steering and the right steering, another of the acceleration and the deceleration, another of the left bank and the right bank, or another of the left turn and the right turn, the drive circuit may set the flickering duty ratio of the another infrared ray marker larger than the flickering duty ratio of the one infrared ray marker. Also in this case, in the same manner as the above-mentioned phase control, by allowing the flickering duty ratio to become a function of an amount of any one of the steering angle, the acceleration/deceleration, the bank angle or the turning angle, it is possible to grasp the traveling state of a vehicle quantitatively with respect to the oncoming vehicle or the succeeding vehicle.

Figure 5:
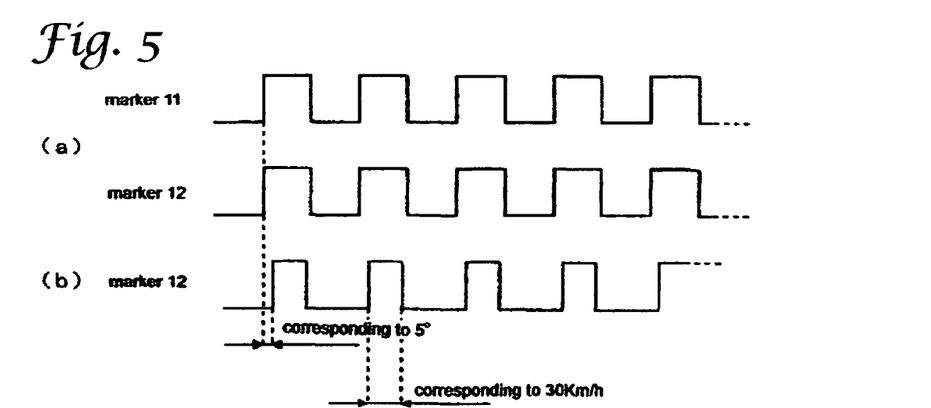
FIG. 5 is a timing chart in the third case, showing the manner in which the light-emitting pattern of the infrared ray markers is changed in response to a traveling state of a vehicle.

FIG. 5 is a timing chart showing another embodiment in which the light emitting patterns of the respective infrared ray markers are changed corresponding to the traveling state of a vehicle. Here, the explanation is made by focusing on two infrared ray marks 11, 12.

For example, assume FIG. 5(*a*) is the light emitting pattern during straight travel at a speed of 50 km per hour, where the steering angle is 0°. When the handle is steered in the right direction to the steering angle of 5°, the vehicle speed is decelerated to 30 km per hour, and this deceleration is detected by the traveling state detecting part 17. The traveling state detecting part 17 instructs the pulse generator 16 to delay the flickering phase of the infrared ray marker 12 with respect to the flickering phase of the infrared ray marker 11 by an angle corresponding to the steering angle of 5° and, at the same time, instructs the pulse generator 16 to lower the duty ratio of the infrared ray marker 12 to a ratio corresponding to the speed of 30 km per hour. As a result, as shown in FIG. 5(*b*), a pulse signal which is outputted to the switching transistor Tr2 of the infrared ray marker 12 from the pulse generator 16 has a phase thereof delayed with respect to a pulse signal which is outputted to the switching transistor Tr1 by an angle of 5° and, at the same time, the duty ratio is lowered to a ratio corresponding to the speed of 30 km per hour.

According to this embodiment, since the light emitting pattern of the infrared ray marker 12 is changed in response to the traveling state of the vehicle, the succeeding vehicle or the oncoming vehicle which includes the recognition device can recognize not only the presence or the non-presence of the vehicle to be recognized but also the traveling state of the vehicle.

Further, according to this embodiment, since three infrared ray markers 11, 12, 13 are arranged in the distributed manner at respective apex positions of the imaginary triangle 14 as viewed in a front view of the vehicle body, on the recognition device side, it is possible to easily and promptly determine whether the infrared light source detected on the infrared image which is obtained by taking the picture of the vehicle is the infrared ray marker or other external light.

Further, since the headlight 3 is arranged in the inside of the triangle 14 which has apexes thereof at three infrared ray markers 11, 12, 13, by placing priority to the retrieval of the periphery of the headlight 3 while using the position of the headlight 3 whose brightness can be highly recognizable as the reference, it is possible to simply and promptly recognize all infrared ray markers 11, 12, 13.

Figure 6:
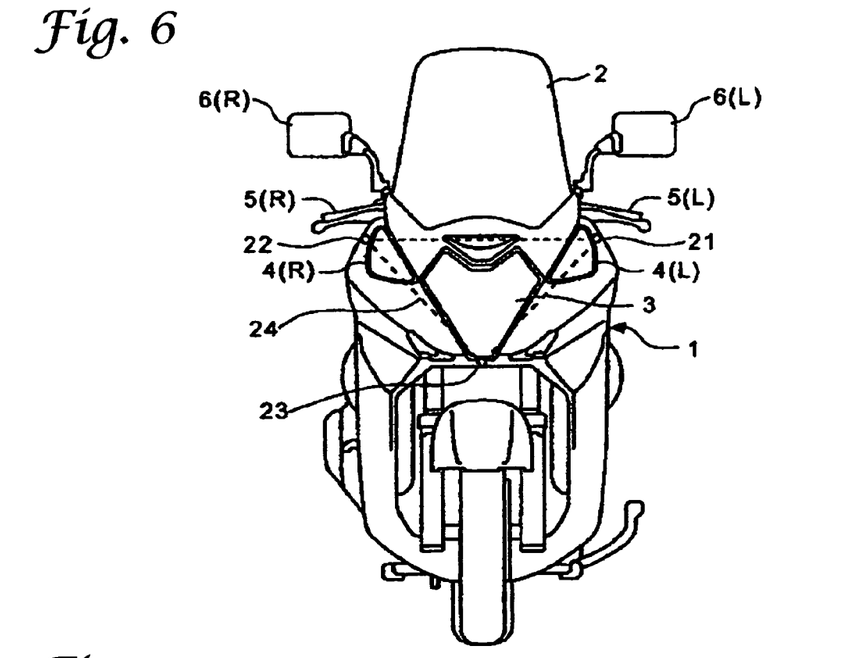
FIG. 6 is a front view of a motorcycle showing one example of an arrangement in the first case of infrared ray markers.

FIG. 6 is a front view of a motorcycle showing another embodiment of an arrangement of the infrared ray markers. In the drawing, symbols equal to the symbols in the previous embodiments indicate same or equivalent parts.

In this embodiment, in place of the first infrared ray marker 11 and the second infrared ray marker 12 which are arranged on back surfaces of the pair of left and right side mirrors 12 (L,R) in the first embodiment, a first infrared ray marker 21 and a second infrared ray marker 22 are arranged at positions in the vicinity of both of left and right end portions of the front cowl 1 and higher than the headlight 3 such that the first infrared ray marker 21 and the second infrared ray marker 22 are directed to a front side of the vehicle. A third infrared ray marker 23 is positioned below the headlight 3 of the front cowl 1 in the same manner as in the previous embodiments.

Also in this embodiment, with respect to the infrared ray image as viewed in a front view of the vehicle, an inverted triangle 24 which uses the first to third infrared ray markers 21, 22, 23 as apexes and arranges the headlight 3 in the inside of the triangle is recognized.

Figure 7:
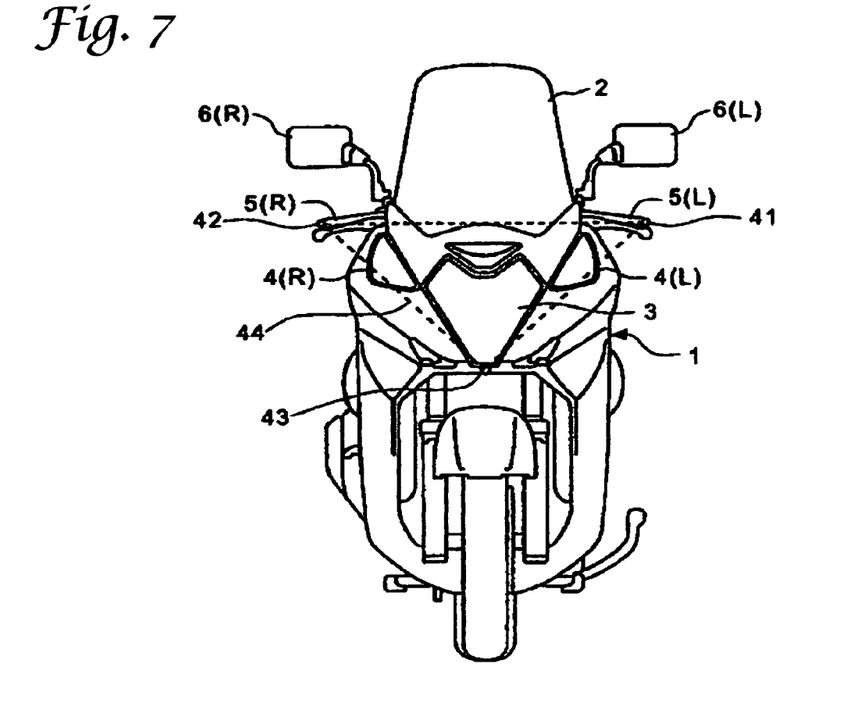
FIG. 7 is a front view of a motorcycle showing another example of an arrangement in the second case of infrared ray markers.

FIG. 7 is a front view of the motorcycle showing yet another embodiment of an arrangement of the infrared ray markers. In the drawing, symbols equal to the symbols in the previous embodiments indicate same or equivalent parts.

In this embodiment, a pair of infrared ray markers, that is, the first infrared ray marker 41 and the second infrared ray marker 42 are mounted on end portions of left and right handle grips 5 (L, R) in a state such that the first infrared ray marker 41 and the second infrared ray marker 42 are directed toward the front side of the vehicle body. Third infrared ray marker 43 is provided at a position below the headlight 3 of the front cowl 1 in a state such that the third infrared ray marker 43 is directed toward the front side of the vehicle body.

Also in this embodiment, with respect to the infrared ray image as viewed in a front view of the vehicle, an inverted triangle 44 which uses the first to third infrared ray markers 41, 42, 43 as apexes and arranges the headlight 3 in the inside of the triangle is recognized. Further, by mounting the first and second infrared ray markers 41, 42 on the handle grips 5, particularly at the time of low-speed traveling in which the steering angle becomes large, the respective infrared ray markers can be easily recognized at the device to be recognized which is positioned in the steering direction.

Here, in the above-mentioned respective embodiments, the explanation has been made with respect to a motorcycle which includes a front cowl 1 as the example. However, the invention is not limited to such a motorcycle and it is recognized that the invention is applicable to a motorcycle which does not include the front cowl.

Figure 8:
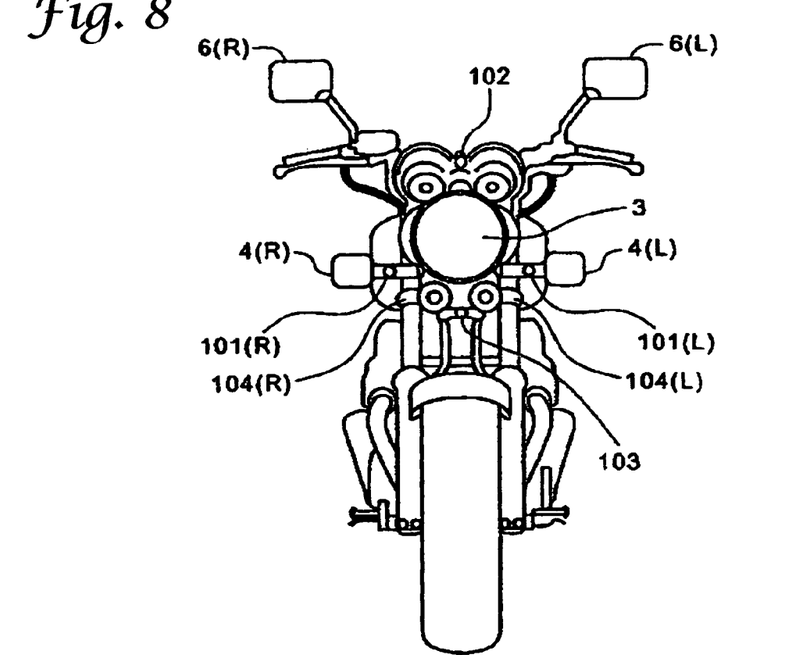
FIG. 8 is a front view of a motorcycle showing another example of an arrangement in the third case of infrared ray markers.

FIG. 8 is a front view showing an embodiment of an arrangement of the infrared ray markers in a motorcycle which does not include the front cowl. In the drawing, symbols equal to the symbols in the previous embodiments indicate same or equivalent parts.

With respect to the motorcycle which does not include the front cowl, the above-mentioned infrared ray markers may be arranged in a distributed manner on the pair of left and right blinker stays 101(L,R) which support the left and right blinker lamps 4(L,R), a meter unit 102, a handle stay 103, a pair of left and right handle pipes 104 (L,R) and the like.

Figure 9:
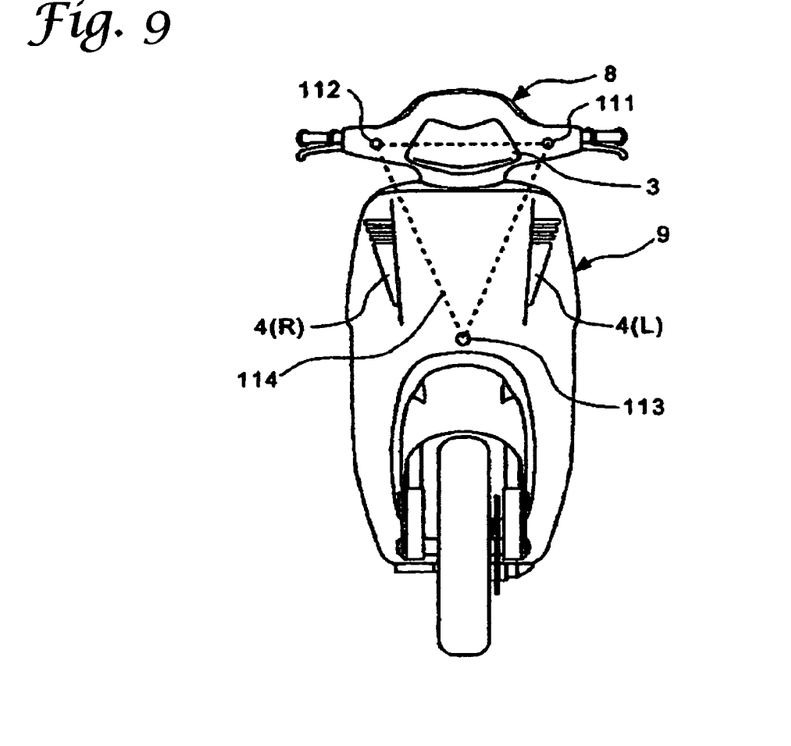
FIG. 9 is a front view of a motorcycle showing another example of an arrangement in the fourth case of infrared ray markers.

FIG. 9 is a front view showing an embodiment of an arrangement of the infrared ray markers in a scooter-type motorcycle. In the drawing, symbols equal to the symbols in the previous embodiments indicate same or equivalent parts.

In this embodiment, first and second infrared ray markers 111, 112 are respectively mounted on left and right sides of the handle cover 8 which is arranged to cover a center portion of the handle. A third infrared ray marker 113 is mounted on a center portion of a distal end of the front cover 9.

Also in this embodiment, with respect to the infrared ray image as viewed in a front view of the vehicle, an inverted triangle 114 which uses the first to third infrared ray markers 111, 112, 113 as apexes is recognized.

Here, in the above-mentioned respective embodiments, although the explanation has been made with respect to the case in which the infrared ray markers are mounted on the front surface of the vehicle, it is also recognized that the infrared ray markers may be mounted on a back surface of the vehicle.

Figure 10:
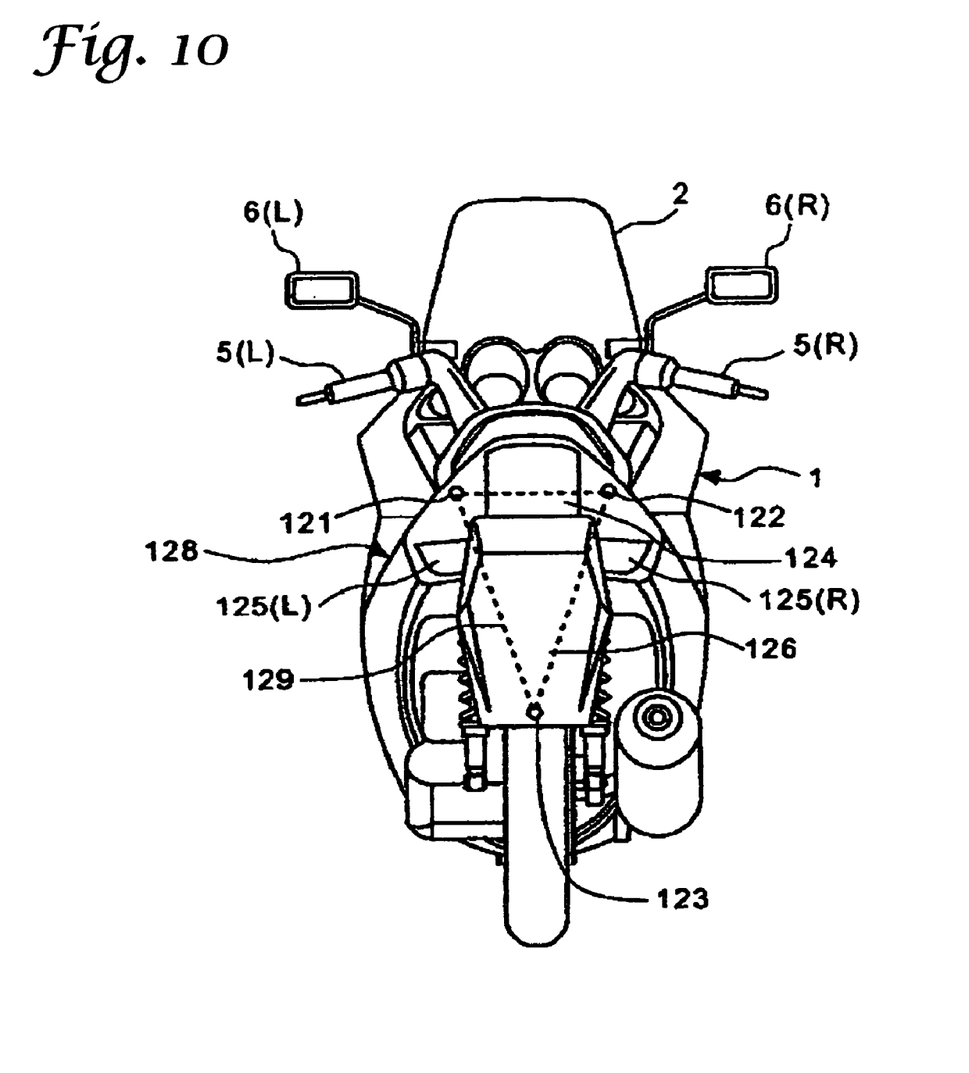
FIG. 10 is a back view of a motorcycle shown in another example of an arrangement in the fifth case of infrared ray markers.

FIG. 10 is a back view of an embodiment in which the infrared ray markers are mounted on a rear portion of the vehicle, wherein symbols equal to the symbols in the previous embodiments indicate same or equivalent parts.

In this embodiment, a taillight 124 is mounted on a center portion of a rear cowl 128, and a pair of left and right blinker lamps 125(L,R) are provided below the taillight 124. First and second infrared ray markers 121, 122 are arranged in a spaced-apart manner at both of left and right sides of the taillight 124, and a third infrared ray marker 123 is mounted on a lower center portion of a number plate holder 126.

Also in this embodiment, with respect to the infrared ray image as viewed in a back view of the vehicle, an inverted triangle 129 which uses the first to third infrared ray markers 121, 122, 123 as apexes is recognized.

The invention claimed is:

1. A vehicle recognition allowing device operating in an environment to recognize the presence or the non-presence of a vehicle, the vehicle recognition allowing device comprising:
   a plurality of infrared ray markers;
   a detecting routine which detects traveling states of the vehicle; and
   a drive circuit which allows the infrared ray markers to emit light in response to at least one detection result of the detecting routine, wherein
   the plurality of infrared ray markers comprises three infrared ray markers arranged in a distributed manner at respective apex positions of an imaginary triangle as viewed from a front view of the vehicle, one of the three infrared ray markers being a marker for the righthand side of the vehicle, and one of the three infrared ray markers being a marker for the lefthand side of the vehicle,
   the drive circuit is configured to control the three infrared ray markers, such that
   (1) the three infrared ray markers during a traveling state of the vehicle emit light in a pattern that corresponds to the apex positions of the imaginary triangle formed by the arrangement of the three infrared ray markers, and
   (2) the three infrared ray markers emit light when the traveling state of the vehicle has changed, the traveling state is expressed by control of the drive circuit to change a light emitting pattern of one of the markers of the righthand side and the lefthand side of the vehicle relative to a light emitting pattern of the other marker of the righthand side and the lefthand side of the vehicle,
   the drive circuit changes at least one of a flickering cycle, a flickering phase, and a flickering duty ratio of the marker for the righthand side of the vehicle relative to the marker for the lefthand side of the vehicle in response to the at least one detecting result of the detecting routine, and
   the vehicle is a motorcycle that has
   a front cowl mounted on a front portion of the motorcycle, and
   the infrared ray marker for the lefthand side of the vehicle and the infrared ray marker for the righthand side of the vehicle are respectively arranged on a back surface of left and right side mirrors directed in a frontward direction of the motorcycle; and one of the infrared ray markers being a third infrared ray marker that is arranged at a position below the front cowl.

2. A vehicle recognition allowing device according to claim 1,
   wherein the detecting routine detects at least one selected from a group consisting of a vehicle speed, a handle steering angle, an acceleration/deceleration, a yaw rate, a bank angle, and a turning direction.

3. A vehicle recognition allowing device according to claim 1,
   wherein when the traveling state of the vehicle is one of left steering and right steering, one of acceleration and deceleration, one of a left bank and a right bank, or one of left turn and right turn, the drive circuit allows an angle of the flickering phase of one of the marker for the righthand side of the vehicle or the marker for the lefthand side of the vehicle to advance with respect to an angle of the flickering phase of the other of the marker for the righthand side of the vehicle or the marker for the lefthand side of the vehicle, while when the traveling state of the vehicle is another of the left steering and the right steering, another of the acceleration and the deceleration, another of the left bank and the right bank, or another of the left turn or the right turn, the drive circuit allows the angle of the flickering phase of the other of the marker for the righthand side of the vehicle or the marker for the lefthand side of the vehicle to advance relative to the angle of the flickering phase of said marker for the righthand side of the vehicle or the marker for the lefthand side of the vehicle.

4. A vehicle recognition allowing device according to claim 1,
   wherein when the traveling state of the vehicle is one of left steering and right steering, one of acceleration and deceleration, one of a left bank and a right bank, or one of left turn and right turn, the drive circuit sets a flickering duty ratio of one of the marker for the righthand side of the vehicle or the marker for the lefthand side of the vehicle larger than a flickering duty ratio of the other of the marker for the righthand side of the vehicle or the marker for the lefthand side of the vehicle, while when the traveling state of the vehicle is another of the left steering and the right steering, another of the acceleration and the deceleration, another of the left bank and the right bank, or another of the left turn and the right turn, the drive circuit sets the flickering duty ratio of the other of the marker for the righthand side of the vehicle or the marker for the lefthand side of the vehicle larger than the flickering duty ratio of said one.

5. A vehicle recognition allowing device according to claim 3,
  wherein an advancing angle amount is a function of an amount of any one of a steering angle, an acceleration/deceleration, a bank angle and a turning angle.

6. A vehicle recognition allowing device according to claim 4,
  wherein the flickering duty ratio is a function of an amount of any one of a steering angle, an acceleration/deceleration, a bank angle and a turning angle.

7. A vehicle recognition allowing device operating in an environment to recognize the presence or the non-presence of a vehicle, the vehicle recognition allowing device comprising:
  a plurality of infrared ray markers;
  a detecting routine which detects traveling states of the vehicle; and
  a drive circuit which allows the infrared ray markers to emit light in response to at least one detection result of the detecting routine, wherein
  the plurality of infrared ray markers comprises three infrared ray markers arranged in a distributed manner at respective apex positions of an imaginary triangle as viewed in at least one of a front view and a back view of the vehicle, one of the three infrared ray markers being a marker on the righthand side of the vehicle, one of the three infrared ray markers being a marker on the lefthand side of the vehicle, and the other of the three markers being a marker on the vehicle below the markers on the righthand and lefthand sides of the vehicle,
  the drive circuit is configured to control the three infrared ray markers, such that
  (1) the three infrared ray markers during a traveling state of the vehicle emit light in a pattern that corresponds to the apex positions of the imaginary triangle formed by the arrangement of the three infrared ray markers, and
  (2) the three infrared ray markers emit light when the traveling state of the vehicle has changed, the traveling state is expressed by control of the drive circuit to change a light emitting pattern of one of the markers of the righthand side and the lefthand side of the vehicle relative to a light emitting pattern of the other marker of the righthand side and the lefthand side of the vehicle,
  the drive circuit changes at least one of a flickering cycle, a flickering phase, and a flickering duty ratio of the marker for the righthand side of the vehicle relative to the marker for the lefthand side of the vehicle in response to the at least one detecting result of the detecting routine, and
  the vehicle is a motorcycle.

* * * * *